United States Patent
Huang

(10) Patent No.: US 12,325,490 B2
(45) Date of Patent: Jun. 10, 2025

(54) WHEEL HUB MOTOR

(71) Applicant: Motek Automation Co., Ltd., New Taipei (TW)

(72) Inventor: Fu-Chang Huang, New Taipei (TW)

(73) Assignee: MOTEK AUTOMATION CO., LTD., New Taipei (TW)

( * ) Notice: Subject to any disclaimer, the term of this patent is extended or adjusted under 35 U.S.C. 154(b) by 552 days.

(21) Appl. No.: 17/821,112

(22) Filed: Aug. 19, 2022

(65) Prior Publication Data

US 2023/0182859 A1 Jun. 15, 2023

(30) Foreign Application Priority Data

Dec. 15, 2021 (TW) .................................. 110214922

(51) Int. Cl.
| | |
|---|---|
| *B62M 6/65* | (2010.01) |
| *B62J 50/22* | (2020.01) |
| *B62M 6/45* | (2010.01) |
| *B62M 6/90* | (2010.01) |
| *H02K 7/00* | (2006.01) |
| *H02K 7/08* | (2006.01) |
| *H02K 7/14* | (2006.01) |

(52) U.S. Cl.
CPC ................ *B62M 6/65* (2013.01); *B62J 50/22* (2020.02); *B62M 6/45* (2013.01); *B62M 6/90* (2013.01); *H02K 7/003* (2013.01); *H02K 7/08* (2013.01); *H02K 7/14* (2013.01)

(58) Field of Classification Search
CPC ... B62M 6/65; B62M 6/45; B62M 6/90; B62J 50/22; H02K 7/003; H02K 7/08; H02K 7/14
See application file for complete search history.

(56) References Cited

U.S. PATENT DOCUMENTS

| | | | |
|---|---|---|---|
| 12,221,190 B2 * | 2/2025 | Lee | ......................... B62J 45/413 |
| 2018/0056774 A1 * | 3/2018 | Chan | ......................... B62M 6/65 |

FOREIGN PATENT DOCUMENTS

| | | | | |
|---|---|---|---|---|
| CN | 102684326 A | * | 9/2012 | |
| CN | 102951248 B | * | 9/2017 | .............. B60L 50/20 |

* cited by examiner

*Primary Examiner* — John D Walters
(74) *Attorney, Agent, or Firm* — Lewis Roca Rothgerber Christie LLP

(57) ABSTRACT

A wheel hub motor includes a shaft, a stator unit and a rotating unit. The stator unit includes a coreless stator set. The rotating unit includes a rotating seat set sleeved on the shaft, a bearing set, and two rotor sets fixedly mounted to the rotating seat set. The rotating seat set defines a bearing mounting space adjacent to the shaft and receiving the bearing set therein, and a rotor space radially spaced apart from the bearing mounting space and receiving the rotor sets therein. The coreless stator set is disposed between the rotor sets such that, when being energized to generate a magnetic field, the rotor sets rotate about the shaft so as to drive the rotating seat set and the bearing set to rotate.

11 Claims, 8 Drawing Sheets

WHEEL HUB MOTOR

CROSS-REFERENCE TO RELATED APPLICATION

This application claims priority to Taiwanese Utility Model patent application No. 110214922, filed on Dec. 15, 2021.

FIELD

The disclosure relates to a motor, more particularly to a wheel hub motor and a driving device for an electric bicycle.

BACKGROUND

Generally, a conventional wheel hub motor mounted on an electric bicycle employs a winding set including an iron core. The disposition of the iron core not only increases the weight of a rotor of the conventional wheel hub motor, but also causes iron loss, which is also known as core loss, in the form of noise and heat. Consequently, during operation of the conventional wheel hub motor, noise is generated and the temperature of the conventional wheel hub motor is increased.

Another type of conventional wheel hub motor employs a coreless winding set to reduce the weight and the iron loss of the aforementioned wheel hub motor. Power cables of the conventional wheel hub motor having a coreless winding set extend into the middle of a central shaft and extend outwardly of one end of the central shaft. Two bearings are disposed respectively adjacent to ends of two rotors of the conventional wheel hub motor distal from the stator of the conventional wheel hub motor. Thus, during operation of the conventional wheel hub motor, each of the bearings is subjected to a magnetic field generated between the a stator and corresponding one of the rotors. As a result, for each of the bearings, frictional contact between rollers of the bearing and an inner surface of the bearing decreases service life of the bearing.

Additionally, in a conventional electric bicycle, a dashboard (which is provided for a user to input and control operation of components of the conventional electric bicycle) is mounted adjacent to steering handle, and other a components of the electric bicycle such as a battery and a wheel hub motor are mounted respectively adjacent to pedals and wheels. Since each of the power cables mounted on the conventional electric bicycle is dedicated to transmission of electric power or signals, wiring of the power cables is relatively complicated.

For example, two power cables are required for the battery to be coupled to the dashboard so as to respectively transmit electric power and signals, and another two power cables are required for the wheel hub motor to be coupled to the battery and the dashboard. In a case that an additional component, e.g., an illuminating lamp, to be controlled by the dashboard is to be mounted on the conventional electric bicycle, two more additional power cables are required to be connected respectively to the battery and the dashboard, which is quite inconvenient to install.

SUMMARY

Therefore, an object of this disclosure is to provide a wheel hub motor that has a relatively long service life, and a driving device for an electric bicycle including a wheel hub motor that has a relatively long service life.

According to an aspect of the disclosure, a wheel hub motor includes a central shaft, a stator unit, and a rotating unit. The central shaft extends along an axis. The stator unit surrounds and is connected fixedly to the central shaft, and includes a positioning seat that is connected fixedly to the central shaft, and a coreless stator set that is configured as a disk and that is connected to the positioning seat. The rotating unit surrounds the central shaft, is rotatable about the central shaft, and includes a rotating seat set that is sleeved on the central shaft, a bearing set, and two rotor sets that are fixedly mounted to the rotating seat set and that are spaced apart from each other along the axis. The rotating seat set defines a bearing mounting space that is adjacent to and surrounds the central shaft and that receives the bearing set therein, and a rotor space that is disposed away from the central shaft, that is radially spaced apart from the bearing mounting space, and that receives the rotor sets therein. The coreless stator set is disposed between the rotor sets such that, when the coreless stator set is energized, the rotor sets rotate about the central shaft so as to drive the rotating seat set and the bearing set to rotate about the central shaft.

According to another aspect of the present disclosure, a driving device for an electric bicycle includes a wheel hub motor, a driving assembly, and an indicating assembly. The wheel hub motor includes a central shaft, a stator unit, and a rotating unit. The central shaft extends along an axis. The stator unit surrounds and is connected fixedly to the central shaft, and includes a positioning seat that is connected fixedly to the central shaft, and a coreless stator set that is configured as a disk and that is connected to the positioning seat. The rotating unit surrounds the central shaft, is rotatable about the central shaft, and includes a rotating seat set that is sleeved on the central shaft, a bearing set, and two rotor sets that are fixedly mounted to the rotating seat set and that are spaced apart from each other along the axis. The rotating seat set defines a bearing mounting space that is adjacent to and surrounds the central shaft and that receives the bearing set therein, and a rotor space that is disposed away from the central shaft, that is radially spaced apart from the bearing mounting space, and that receives the rotor sets therein. The coreless stator set is disposed between the rotor sets such that, when the coreless stator set is energized, the rotor sets rotate about the central shaft so as to drive 20 the rotating seat set and the bearing set to rotate about the central shaft. The driving assembly is coupled to the coreless stator set of the wheel hub motor, and includes a driving member that is operable to supply electric power to the coreless stator set and a control member that is electrically connected to the driving member to control operation of the driving member. The indicating assembly is coupled to the control member, and includes a battery unit that provides electric power to the driving assembly, an indicating unit that is configured to transmit signals between the driving assembly and the indicating assembly, and a power cable that is coupled between the driving assembly and the indicating assembly to transmit electric power therebetween.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
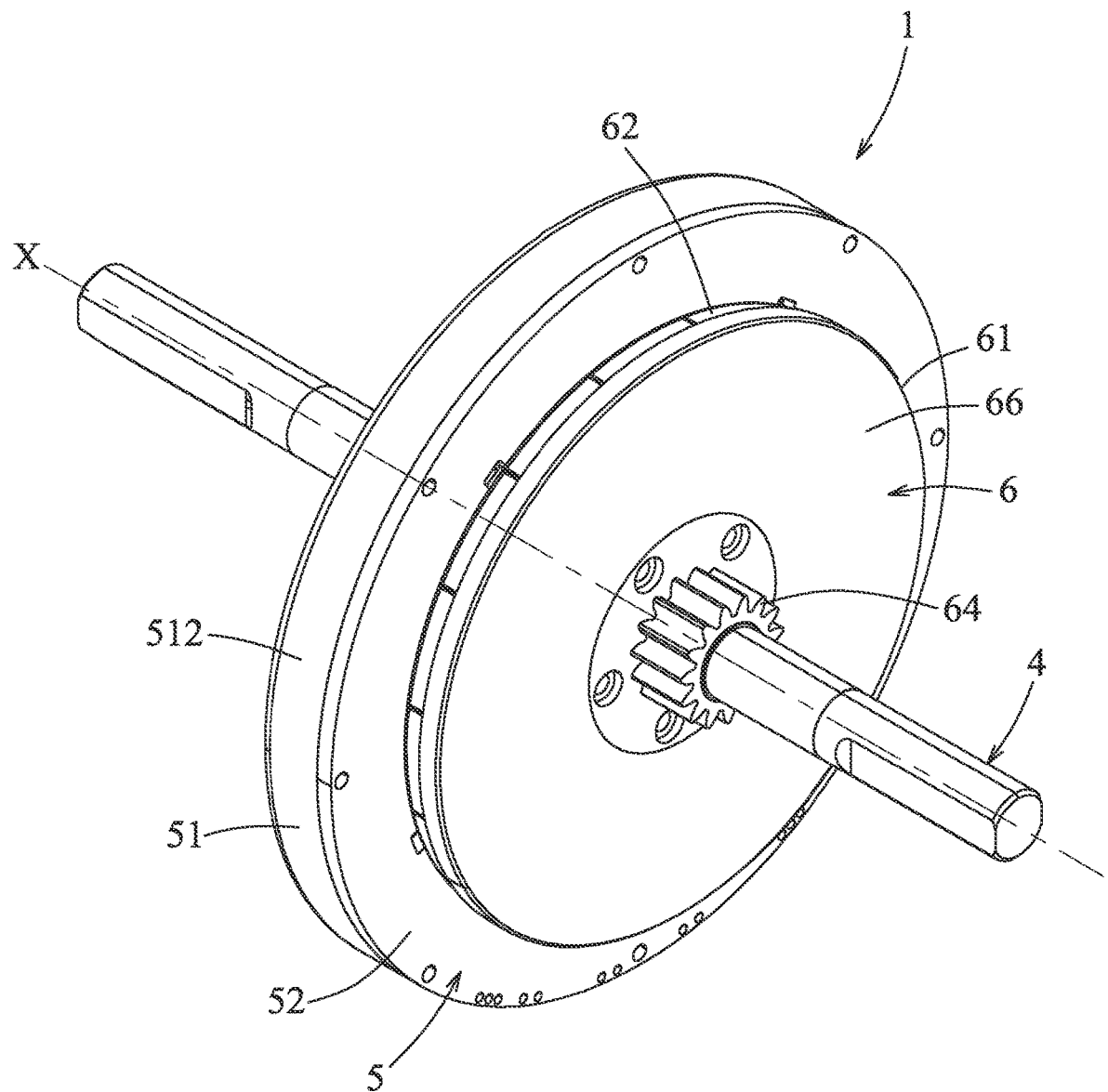
FIG. 1 is a perspective view of a wheel hub motor of a driving device for an electric bicycle according to an embodiment of the present disclosure.
Figure 2:
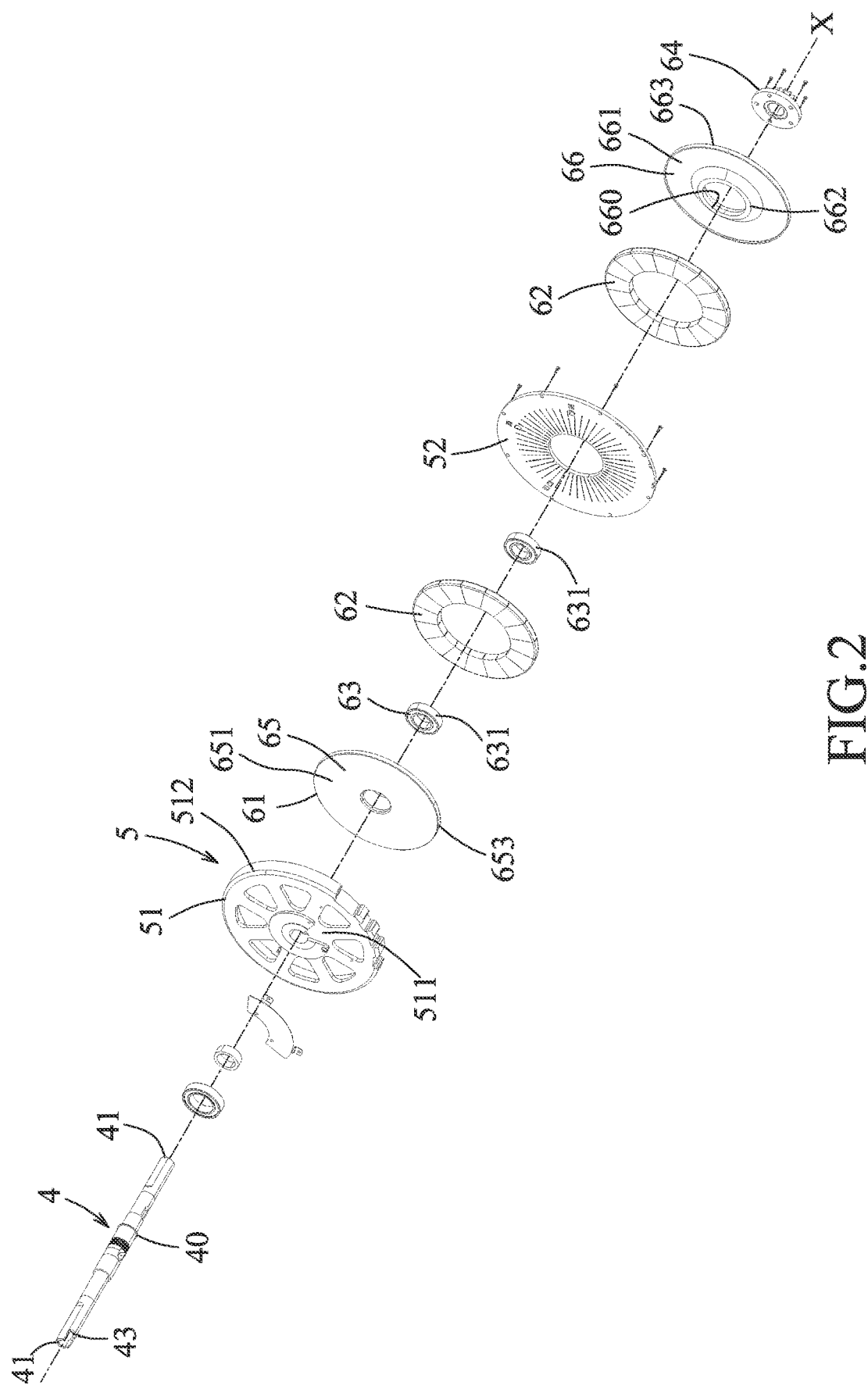
FIG. 2 is an exploded perspective view of the wheel hub motor.
Figure 8:
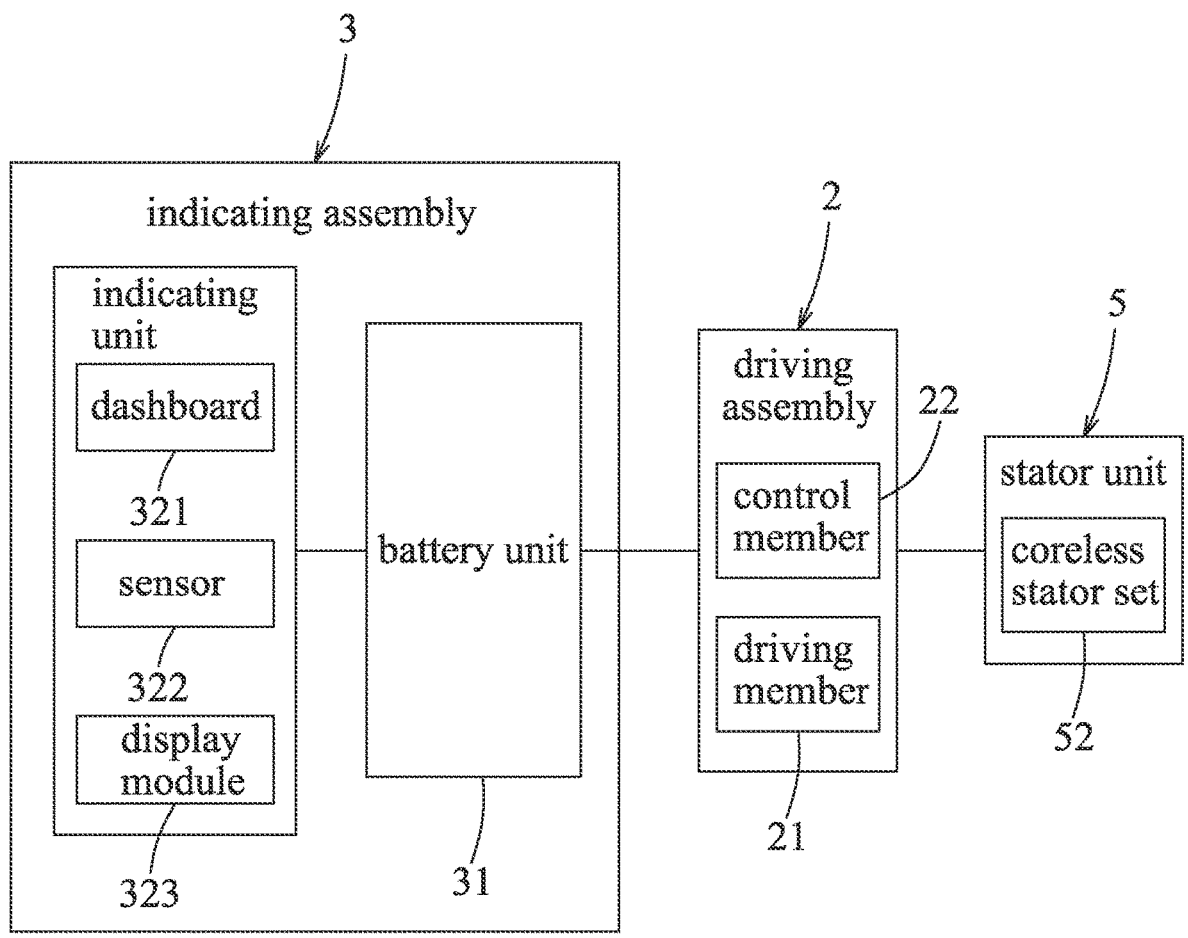
FIG. 8 is a block diagram illustrating the embodiment.

Referring to FIGS. 1, 2 and 8, an embodiment of a driving device for an electric bicycle (not shown) includes a wheel hub motor 1, a driving assembly 2 and an indicating assembly 3.

Figure 3:
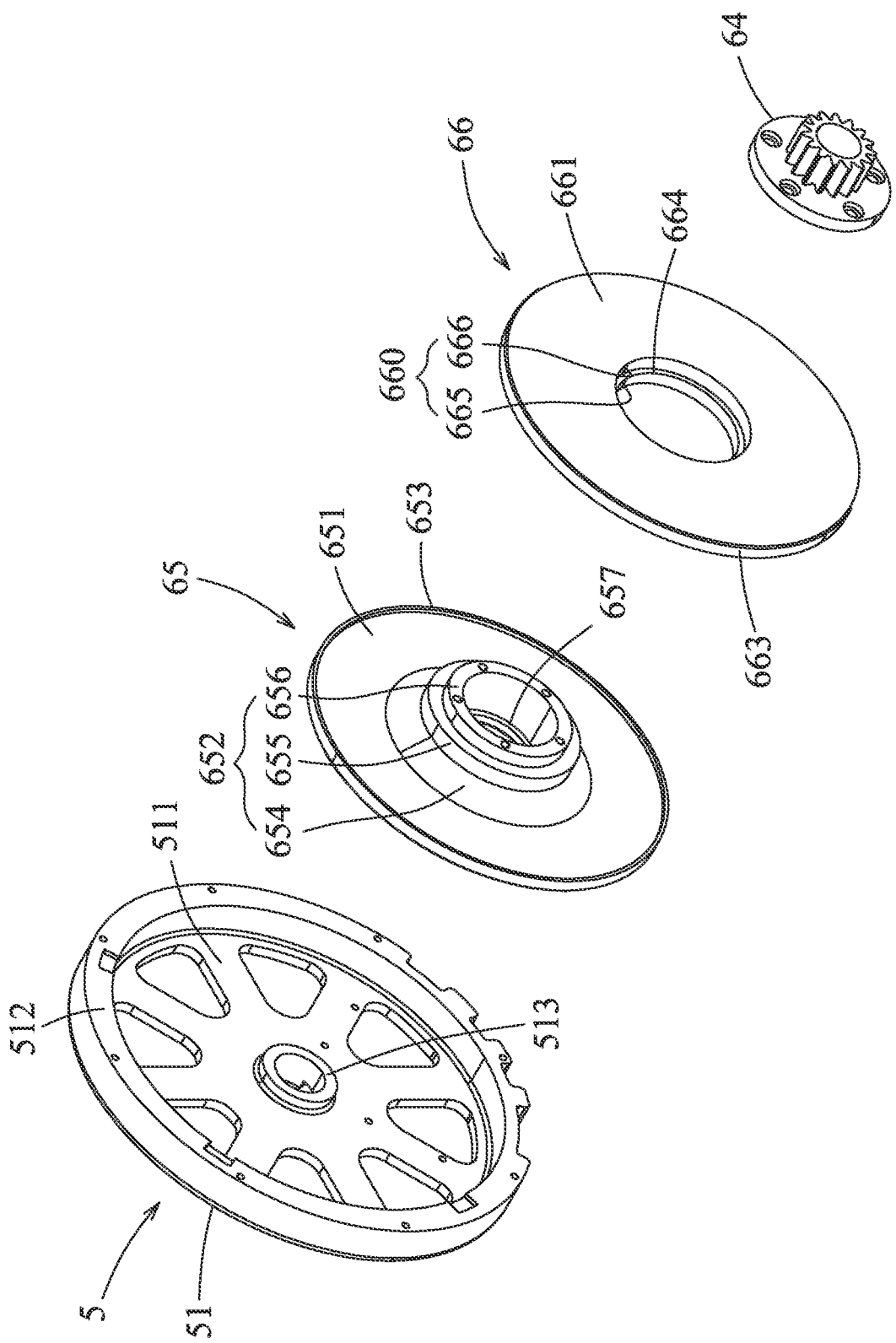
FIG. 3 is a schematic exploded perspective view of a stator unit and a rotating unit of the wheel hub motor.
Figure 5:
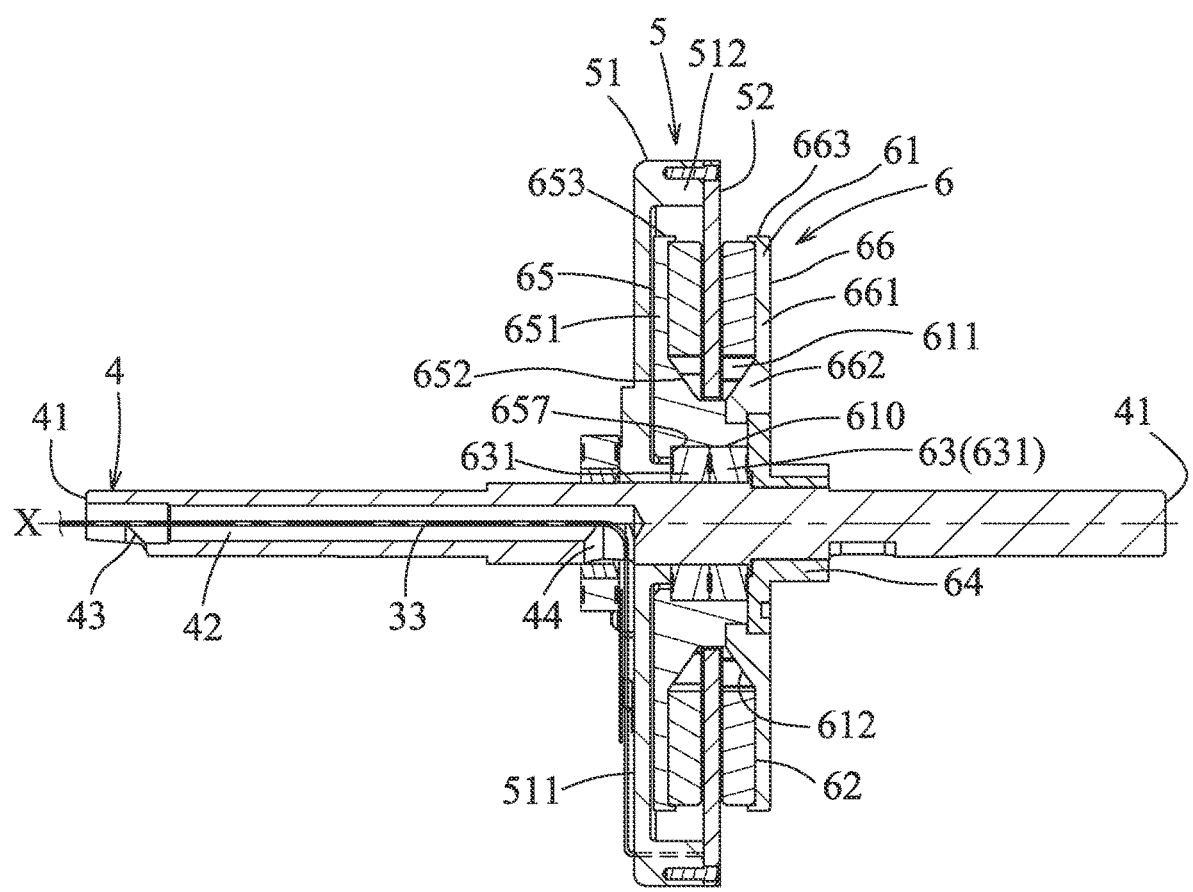
FIG. 5 is a sectional view taken along line V-V of FIG. 4.

Referring to FIGS. 2, 3 and 5, the wheel hub motor 1 includes a central shaft 4 extending along an axis (X), a stator unit 5 connected fixedly to the central shaft 4, and a rotating unit 6 surrounding the central and shaft 4 being rotatable about the central shaft 4.

The stator unit 5 includes a positioning seat 51 that is connected fixedly to the central shaft 4, and a coreless stator set 52 that is configured as a disk and that is detachably connected to the positioning seat 51.

In this embodiment, the fixed seat 51 includes a fixed seat body 511 surrounding the central shaft 4 and a mounting flange 512 extending from an outer periphery of the fixed seat body 511 toward the coreless stator set 52 along a direction parallel to the axis (X). In this embodiment, the coreless stator set 52 is a printed circuit board (PCB) winding set that generates a magnetic field in a direction parallel to the axis (X), which is also referred to as axial flux, when being energized. In this embodiment, the coreless stator set 52 is detachably mounted to the mounting flange 512 by screws.

Figure 4:
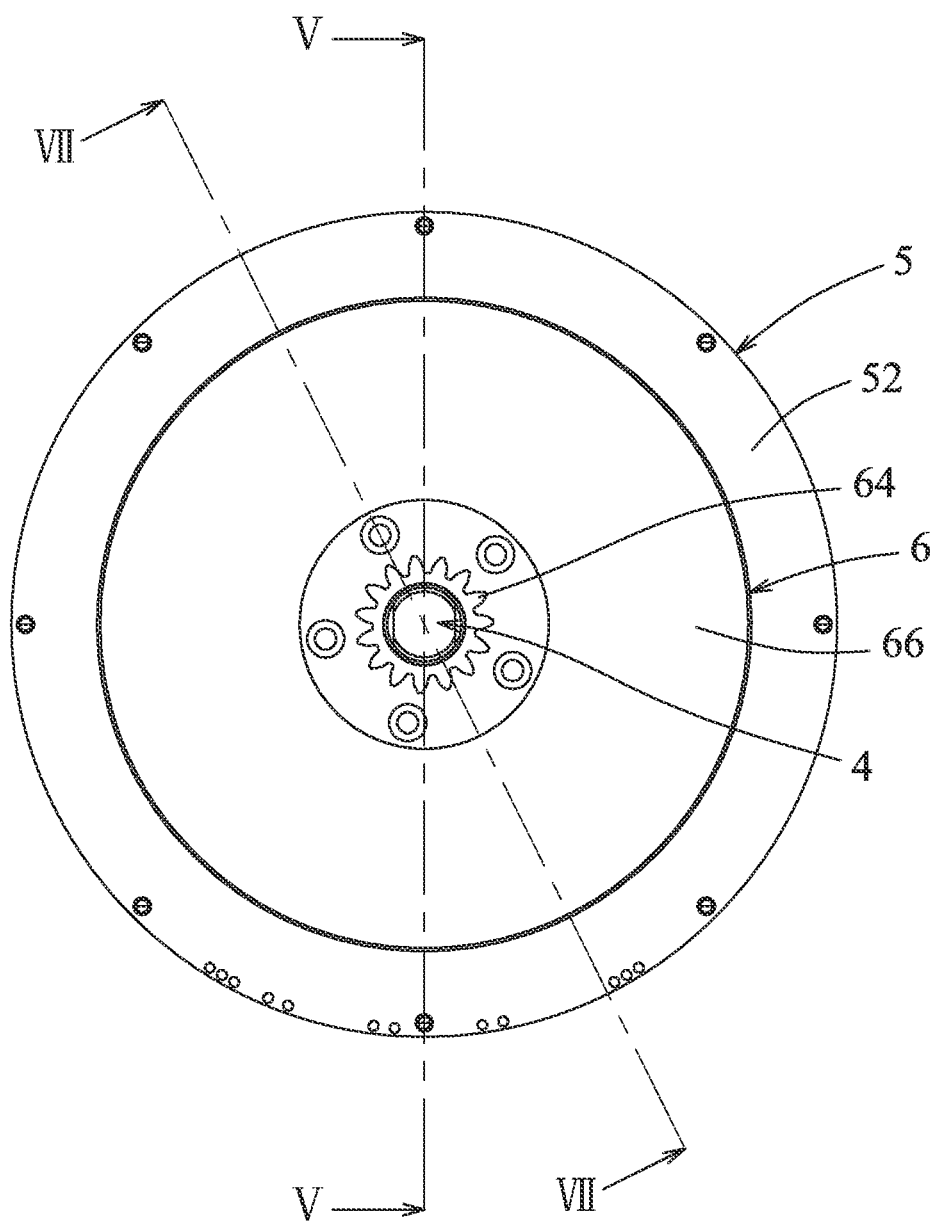
FIG. 4 is a schematic side view of the wheel hub motor.

Referring to FIGS. 3 to 5, the rotating unit 6 includes a rotating seat set 61 that is sleeved on the central shaft 4, two rotor sets 62 that are fixedly mounted to the rotating seat set 61 and that are spaced apart from each other along the axis (X), a bearing set 63, and a transmission gear 64.

The rotating seat set 61 defines a bearing mounting space 610 that is adjacent to and surrounds the central shaft 4, and a rotor space 611 that is disposed away from the central shaft 4, that is radially spaced apart from the bearing mounting space 610, and that receives the rotor sets 62 and the coreless stator set 52 therein. Referring to FIGS. 2, 3, 5 and 6, specifically, in this embodiment, the rotating seat set 61 includes a first rotating seat 65 and a second rotating seat 66 that are assembled to each other and that are arranged along the axis (X).

Figure 6:
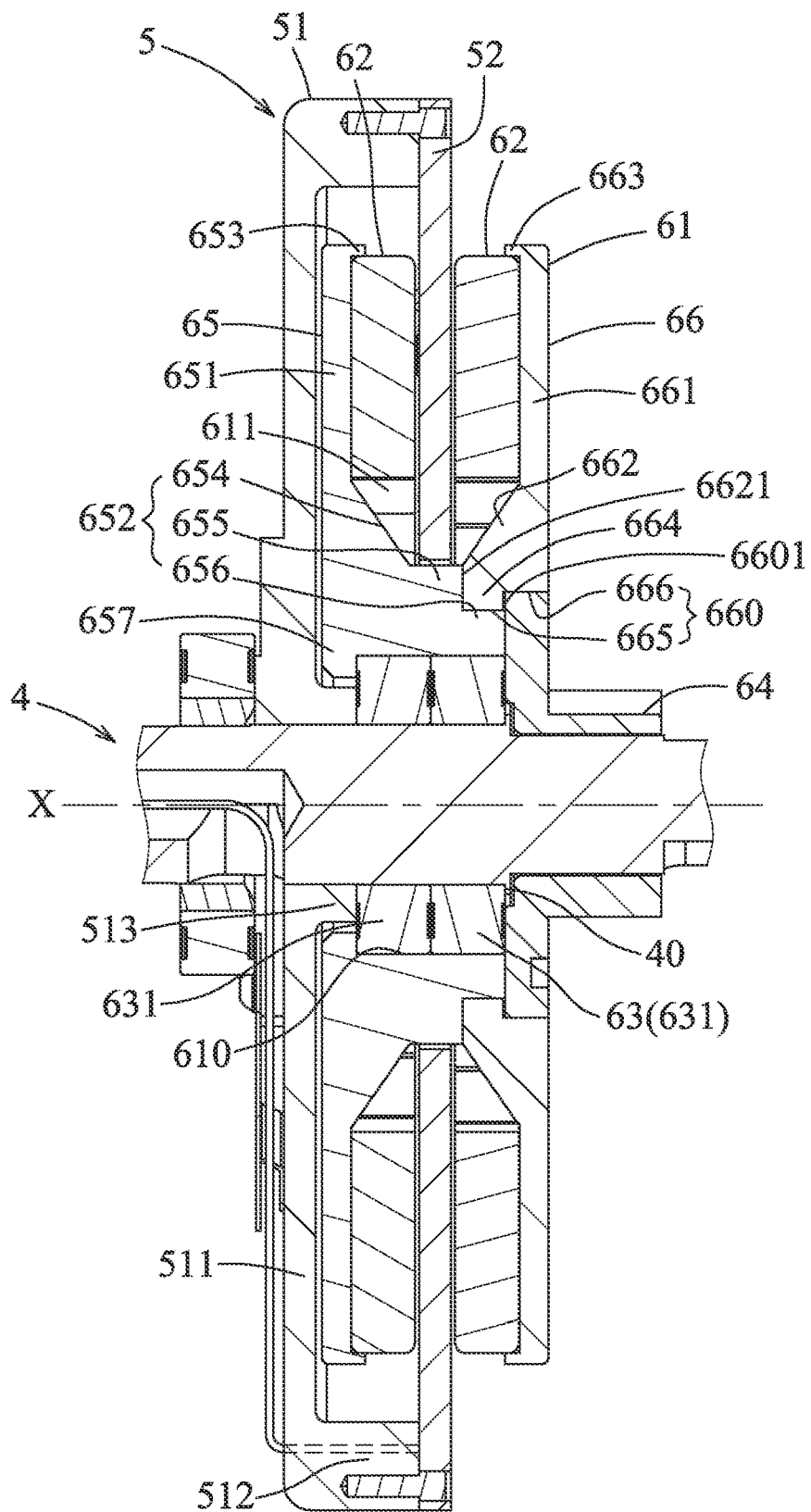
FIG. 6 is an enlarged view of a portion of FIG. 5.

Referring to FIGS. 3, 5 and 6, the first rotating seat 65 includes a first seat body 651 disposed between the positioning seat 51 and the coreless stator set 52 and having inner and outer ends that are radially opposite to each other, a first extending portion 652 extending from the inner end of the first seat body 651, which is proximate to the central shaft 4, toward the second rotating seat 66, and a first positioning flange 653 extending from the outer end of the first seat body 651 toward the second rotating seat 66. The first extending portion 652 has an outer diameter smaller than that of the first seat body 651 and has a frustoconical portion 654 extending from the first seat body and converging toward the second rotating seat 66 along a direction parallel to the axis (X), a stator mounting portion 655 extending from the frustoconical portion 654 toward the second rotating seat 66 and being surrounded by the coreless stator set 52, and an abutting portion 656 extending from the stator mounting portion 655 away from the frustoconical portion 654 and having an outer diameter smaller than that of the stator mounting portion 655. Additionally, the first seat body 651 further includes a first inner flange 657 that extends radially and inwardly toward the central shaft 4 and that is disposed closer to the central shaft 4 than the first extending portion 652.

Referring to FIGS. 2, 5 and 6, the second rotating seat 66 includes a second seat body 661 having inner and outer ends that are radially opposite to each other, a second extending portion 662 extending from the inner end of the second seat body 661, which is proximate to the central shaft 4, toward the first rotating seat 65 along the axis (X), tapering from the second seat body 661 toward the first rotating seat 65, and having an outer diameter smaller than that of the second seat body 661, a second positioning flange 663 extending from the outer end of the second seat body 661 toward the first rotating seat 65, and a second inner flange 664 extending radially and inwardly from the second extending portion 662 toward the central shaft 4. Specifically, the second extending portion 662 has an end face 6621 abutting against shoulder a surface formed between the stator mounting portion 655 and the abutting portion 656. The second inner flange 664 abuts against the abutting portion 656. The second extending portion 662 has an inclined surface disposed symmetrically to an inclined face of the frustoconical portion 654 along a hypothetical line parallel to a radial direction transverse to the axis (X). The second rotating seat 66 defines a mounting hole 660 surrounding the central shaft 4. Specifically, the second inner flange 664 cooperates with the second seat body 661 and the second extending portion 662 to define the mounting hole 660. The mounting hole 660 has a receiving hole portion 665 that is defined by the second inner flange 664 and that receives the abutting portion 656 therein, and a mounting hole portion 666 that is mainly defined by the second seat body 661. The mounting hole portion 666 communicates with the receiving hole portion 665 and has a dimension greater than that of the receiving hole portion 665. The transmission gear 64 is disposed in the mounting hole portion 666 and abuts against a shoulder 6601 formed between the receiving hole portion 665 and the mounting hole portion 666. In this embodiment, the abutting portion 656 of the first rotating seat 65 abuts against the second inner flange 664 defining the receiving hole portion 665, and the first rotating seat 65 and the second rotating seat 66 are detachably assembled to each other.

Referring to FIGS. 3, 5 and 6, the first inner flange 657 cooperates with an inner surface of the first extending portion 652 that faces the central shaft 4 to define the bearing mounting space 610. The rotor space 611 is defined among the first seat body 651, the first extending portion 652, the first positioning flange 653, the second seat body 661, the second extending portion 662 and the second positioning flange 663.

Referring to FIG. 2, the rotor sets 62 are mounted fixedly and respectively to the first rotating seat 65 and the second rotating seat 66, and are disposed respectively at opposite sides of the coreless stator set 52 along the axis (X). One of the rotor sets 62 is disposed among the first positioning flange 653, the first seat body 651, the frustoconical portion 654, and a the coreless stator set 52. The other one of the rotor sets 62 is disposed among the second positioning flange 663, the second seat body 661, the second extending portion 662, and the coreless stator set 52. Each of the rotor sets 62 includes a plurality of permanent magnets surrounding the central shaft 4. The coreless stator set 52 is disposed between the rotor sets 62 such that, when the coreless stator set 52 is energized to generate a magnetic field, the rotor sets 62 rotate about the central shaft 4 so as to drive the rotating seat set 61 and the bearing set 63 to rotate about the central shaft 4.

In detail, the first positioning flange 653 and the second positioning flange 663 are provided for preventing excessive precession of the rotor sets 62 when the rotor sets 62 are rotating. The frustoconical portion 654 and the second extending portion 662 are provided for preventing excessive precession of the rotor sets 62. That is to say, one of the rotor sets 62 is confined between the frustoconical portion 654 and the first positioning flange 653 and the other one of the rotor sets 62 is confined between the second extending portion 662 and the second positioning flange 663. In this embodiment, each of the permanent magnets of the rotor sets 62 has a length along the radial direction matching both a length of a portion of the first rotating seat 65 disposed between the frustoconical portion 654 and the first positioning flange 653 along the radial direction, and a length of the second rotating seat 66 disposed between the second extending portion 662 and the second positioning flange 663 along the radial direction, so as to prevent excessive precession of the rotor sets 62.

The bearing set 63 surrounds the central shaft 4 and is received in the bearing mounting space 610. The bearing set 63 is constrained between the first inner flange 657 and the transmission gear 64 and is not movable along the axis (X). In this embodiment, the positioning seat 51 includes an inner flange 513 proximate to the central shaft 4 and extending toward the first rotating seat 65. The central shaft 4 includes an annular shaft flange 40 extending outwardly from an outer surface of the central shaft 4 along the radial direction. Thus, the bearing set 63 is further constrained between the inner flange 513 and the annular shaft flange 40 and is not movable along the axis (X). In this embodiment, the bearing set 63 includes two bearings 631 arranged along the axis (X), but the number of the bearings 631 is not limited to two.

Since the bearing mounting space 610 is spaced apart from the rotor space 611 along the radial direction, the bearing set 63 is spaced apart from the rotor sets 62 and the coreless stator set 52 along the radial direction, and will therefore be subjected to a relatively smaller resultant force from the magnetic field generated by the coreless stator set 52, such that wear on the bearing set 63 can be reduced and the service life of the wheel hub motor of the present disclosure is increased.

Figure 7:
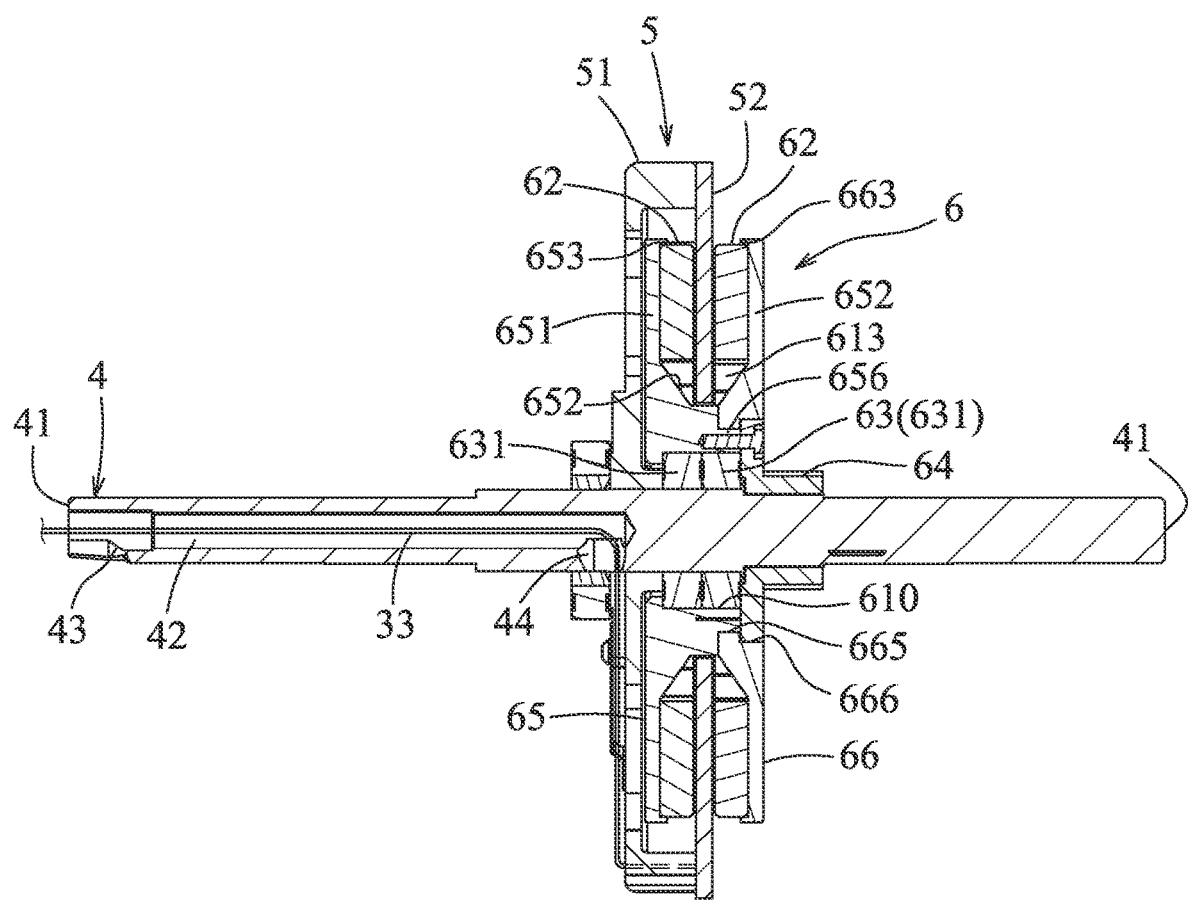
FIG. 7 is a sectional view taken along line VII-VII of FIG. 4.

Referring to FIGS. 6 and 7, it should be noted that the transmission gear 64 is fastened to the abutting portion 656 of the first rotating seat 65 of the rotating seat set 61 by screws. The transmission gear 64 is adapted to be connected to a ring gear portion of a motor housing (not shown) through a deceleration device, e.g., a planetary gearset, but is not limited to this. When the rotor sets 62 rotate, the transmission gear 64 rotates with the first rotating seat 65 of the rotating seat set 61 and transmits rotational force to rotate the motor through the deceleration device and the ring gear portion, so as to drive rotation of a wheel of the electric bicycle mounted with the driving device of the present disclosure. Since various ways of mounting the driving device to the electric bicycle are well known in the art, further details of the same are omitted for the sake of brevity.

Referring to FIGS. 5 and 8, the driving assembly 2 is coupled to the coreless stator set 52 of the wheel hub motor 1, and includes a driving member 21 that is operable to supply electric power to and drive the coreless stator set 52 to generate the magnetic field and a control member 22 that is electrically connected to the driving member 21 to control operation of the driving member 21. In one embodying aspect of this embodiment, the driving assembly 2 is fixed on the positioning seat 51 of the wheel hub motor 1.

The indicating assembly 3 is coupled to the control member 22, and includes a battery unit 31, an indicating unit 32 that is configured to transmit signals between the driving assembly 2 and the indicating assembly 3, and a power cable 33 that is coupled between the driving assembly 2 and the indicating assembly 3 to transmit electric power and signals therebetween.

The battery unit 31 stores and provides electric power to the driving assembly 2 and is rechargeable by an external power source. In this embodiment, the battery unit 31 is adapted to be mounted adjacent to pedals of the electric bicycle, but the present disclosure is not limited to this example.

The indicating unit 32 includes a dashboard 321, a sensor 322, and a display module 323.

The battery unit 31 is connected to and is in power line communication (PLC) with the indicating unit 32 and the driving assembly 2 through the power cable 33. That is to say, the power cable 33 is provided for transmitting electric power from the battery unit 31 to the indicating unit 32 and the driving assembly 2 and for transmitting signals between the indicating unit 32 and the driving assembly 2. In the conventional driving device, in a case that the number of the indicating units 32 is to be increased, two power cables 33 are required to respectively transmit signals and electric power between the driving assembly 2 and an additional indicating unit 32 for each additional indicating unit 32. In the present disclosure, only one power cable 33 coupled to the battery unit 31 and capable of transmitting electric power and signals at the same time is required to couple the indicating unit 32 to the driving assembly 2 to thereby permit the indicating unit 32 to be controlled by the control member 22 of the driving assembly 2. Thus, a relatively simple wiring of the power cable can be provided.

Additionally, it should be noted that in this embodiment, the central shaft 4 is formed with two opposite end surfaces 41, a cable receiving space 42 extending from one of the end surfaces 41, a slot 43 formed in one of the end surfaces 41 and in spatial communication with an open end of the cable receiving space 42, and a wire hole 44 formed in an outer surface of the central shaft 4 and in spatial communication with the other open end of the cable receiving space 42. The power cable 33 extends from the battery unit 31, through one of the end surfaces 41 of the central shaft 4 and the slot 43, and into the cable receiving space 42 and extends outwardly of the central shaft 4 through the wire hole 44 to be coupled to the coreless stator set 52. Specifically, in a variation of this embodiment, the driving member 21 and the coreless stator set 52 are integrated on a circuit board, the power cable 33 extends outwardly of the wire hole 44 and then is coupled to the driving member 21 of the circuit board, to thereby be coupled to the coreless stator set 52 through the driving member 21. In another variation of this embodiment, the driving member 21 and the coreless stator set 52 are two separate members, and the driving member 21 is fixed to the positioning seat 51 and coupled to the coreless stator set 52 through an electric wire (not shown). The power cable 33 extends through the wire hole 44, is coupled to the driving member 21, and is coupled to the coreless stator set 52 through the driving member 21.

Referring to FIG. 8, signal transmission among the indicating unit 32, the driving assembly 2 and the wheel hub motor 1 and operation control of the driving assembly 2 includes, but not limited to, the following three aspects

[1] Control of Rotational Speed of the Wheel Hub Motor 1

The dashboard 321 is generally disposed on a steering handle of the electric bicycle and is configured to, in response to receipt of a user input, output a control signal related to operation of the wheel hub motor 1 to the control member 22. The user input includes but is not limited to touch input or input through keyboards. The control member 22 is configured to output a driving signal corresponding to the control signal to the driving member 21 upon receipt of the control signal. The driving member 21 is configured to supply electric power and energize the coreless stator set 52 of the wheel hub motor 1 according to the driving signal. In this way, the rotational speed of the wheel hub motor 1 can be adjusted according to user demand or environmental factors.

[2] Display of a Motor Operating State of the Wheel Hub Motor 1

The sensor 322 is configured to detect and output a motor operating signal related to a motor operating state of the wheel hub motor 1 to the control member 22. The control member 22 is configured to output a display signal corresponding to the motor operating signal to the dashboard 321 upon receipt of the motor operating signal. The dashboard 321 is configured to display a motor information related to the motor operating state of the wheel hub motor 1 according to the display signal. The motor information includes, but not limited to, any one temperature, rotational speed, of operating operating time duration, power consumption of the wheel hub motor 1, rotational speed of the wheel, range of the electric bicycle, residual electric power of the battery unit 31, and a combination thereof.

[3] Control and Display of an Operating State of the Display Module 323

The display module 323 is electrically connected to the battery unit 31 and communicatively connected to the control member 22. The dashboard 321 is configured to, in response to receipt of a user input, output a light control signal related to light emission of the display module 323 to the control member 22.

The control member 22 is configured to output a light-emitting control signal corresponding to the light control signal to the display module 323 upon receipt of the light control signal. The display module 323 is configured to emit light according to the light-emitting control signal. Additionally, the display module 323 is configured to output a display operating signal related to a light-emitting state of the display module 323 to the control member 22. The control member 22 is configured to output a display signal corresponding to the display operating signal to the dashboard 321 upon receipt of the display operating signal. The dashboard 321 is configured to display a display information related to the light-emitting state of the display module 323 according to the display signal. It should be noted that the control member 22 is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

To sum up, in the wheel hub motor 1 of the present disclosure, since the bearing mounting space 610 is radially spaced apart from the rotor space 611, the bearing set 63 is spaced apart from the rotor sets 62 and the coreless stator set 52 along the radial direction and is therefore subjected to a relatively smaller resultant force from the magnetic field. Thus, wear on the bearing set 63 can be reduced and the object of the present disclosure can be indeed achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheel hub motor comprising:
   a central shaft extending along an axis;
   a stator unit surrounding and connected fixedly to said central shaft, and including a positioning seat that is connected fixedly to said central shaft, and a coreless stator set that is configured as a disk and that is connected to said positioning seat; and
   a rotating unit surrounding said central shaft rotatable about said central shaft, and including a rotating seat set that is sleeved on said central shaft, a bearing set, and two rotor sets that are fixedly mounted to said rotating seat set and spaced apart from each other along the axis, said rotating seat set defining a bearing mounting space that is adjacent to and surrounds said central shaft and that receives said bearing set therein, and a rotor space that is disposed away from said central shaft, that is radially spaced apart from said bearing mounting space, and that receives said rotor sets therein, said coreless stator set being disposed between said rotor sets such that, when said coreless stator set is energized, said rotor sets rotate about said central shaft so as to drive said rotating seat set and said bearing set to rotate about said central shaft.

2. The wheel hub motor as claimed in claim 1, wherein said rotating seat set includes a first rotating seat and a second rotating seat that are assembled to each other and that are arranged along the axis, said first rotating seat being disposed adjacent to said positioning seat and including an abutting portion, said second rotating seat defining a mounting hole receiving said abutting portion therein.

3. The wheel hub motor as claimed in claim 2, wherein:
   said first rotating seat includes a first seat body disposed between said positioning seat and said coreless stator set, and a first extending portion extending from said first seat body toward said second rotating seat and having an outer diameter smaller than that of said first seat body, said first seat body including a first inner flange that extends radially and inwardly toward said central shaft and that is disposed closer to said central shaft than said first extending portion;

said second rotating seat includes a second seat body, a second extending portion extending from one end of said second seat body, which is proximate to said central shaft, toward said first rotating seat along the axis, and having an outer diameter smaller than that of said second seat body, and a second inner flange extending radially and inwardly from said second extending portion toward central shaft, said second inner flange cooperating with said second seat body and said second extending portion to define said mounting hole, said mounting hole having a receiving hole portion that is defined by said second inner flange and that receives said abutting portion therein, and a mounting hole portion that communicates with said receiving hole portion and that has a dimension larger than that of said receiving hole portion; and said rotating unit further includes a transmission gear disposed in said mounting hole portion and abutting against a shoulder formed between said receiving hole portion and said mounting hole portion, said first inner flange cooperating with said first extending portion to define said bearing mounting space.

4. The wheel hub motor as claimed in claim 1, wherein:
said rotating seat set includes s a first rotating seat and a second rotating seat that are assembled to each other and that are arranged along the axis;
said first rotating seat includes:
   a first seat body disposed between said positioning seat and said coreless stator set and having two ends that are radially opposite to each other,
   a first extending portion extending from one of said ends of said first seat body, which is proximate to said central shaft, toward said second rotating seat, and having an outer diameter smaller than that of said first seat body, and
a first positioning flange extending from the other one of said ends of said first seat body toward said second rotating seat,
said second rotating seat includes:
   a second seat body having two ends that are radially opposite to each other,
   a second extending portion extending from one of said ends of said second seat body which is proximate to said central shaft, and tapering from said second seat body toward said first rotating seat, and
   a second positioning flange extending from the other one of said ends of said second seat body toward said first rotating seat; and
   said rotor space is defined among said first seat body, said first extending portion, said first positioning flange, said second seat body, said second extending portion and said second positioning flange.

5. The wheel hub motor as claimed in claim 4, wherein:
said first extending portion has a frustoconical portion extending from said first seat body and converging toward said second rotating seat along a direction parallel to said axis, a stator mounting portion extending from said frustoconical portion toward said second rotating seat being surrounded by said coreless stator set, and an abutting portion extending from said stator mounting portion away from said frustoconical portion and having an outer diameter smaller than that of said stator mounting portion; and said second rotating seat fittingly abutting against said abutting portion, one of said rotor sets being disposed among said first positioning flange, said first seat body, said frustoconical portion, and said coreless stator set, the other one of said rotor sets being disposed among said second positioning flange, said second seat body, said second extending portion, and said coreless stator set.

6. The wheel hub motor as claimed in claim 1, wherein said central shaft has an outer surface formed with a wire hole that is adapted to permit a power cable to extend through, which is for supplying electric power to said wheel hub motor, to extend therethrough.

7. A driving device for an electric bicycle comprising:
a wheel hub motor including
   a central shaft extending along an axis;
   a stator unit surrounding and connected fixedly to said central shaft, and including a positioning seat that is connected fixedly to said central shaft, and a coreless stator set that is configured as a disk and that is connected to said positioning seat; and
   a rotating unit surrounding said central shaft and rotatable about said central shaft, and including a rotating seat set that is sleeved on said central shaft, a bearing set, and two rotor sets that are fixedly mounted to said rotating seat set and spaced apart from each other along the axis, said rotating seat set defining a bearing mounting space that is adjacent to and surrounds said central shaft and that receives said bearing set therein, and a rotor space that is disposed away from said central shaft, that is radially spaced apart from said bearing mounting space, and that receives said rotor sets therein, said coreless stator set being disposed between said rotor sets such that, when said coreless stator set is energized, said rotor sets rotate about said central shaft so as to drive said rotating seat set and said bearing set to rotate about said central shaft;
a driving assembly coupled to said coreless stator set of said wheel hub motor, and including that is operable to supply a driving member electric power to said coreless stator set and a control member is electrically connected to said driving member to control operation of said driving member; and
an indicating assembly coupled to said control member, and including a battery unit that provides electric power to said driving assembly, an indicating unit that is configured to transmit signals between said driving assembly and said indicating assembly, and a power cable that is coupled between said driving assembly and said indicating assembly to transmit electric power therebetween.

8. The driving device as claimed in claim 7, wherein said wire hole is formed adjacent to said positioning seat, central shaft being said further formed with a cable receiving space extending from an end surface of said central shaft and in spatial communication with said wire hole, said power cable extending from said battery unit, through said end surface of said central shaft and into said cable receiving space and extending outwardly of said central shaft through said wire hole.

9. The driving device as claimed in claim 7, wherein said indicating unit of said indicating assembly includes a dashboard configured to, in response to receipt of a user input, output a control signal related to operation of said wheel hub motor to said control member, said control member being configured to output a driving signal corresponding to the control signal to said driving member upon receipt of the control signal, said driving member being configured to supply electric power and energize said coreless stator set of said wheel hub motor according to the driving signal.

10. The driving device as claimed in claim 9, wherein said indicating assembly further includes a sensor configured to detect and output a motor operating signal related to a motor operating state of said wheel hub motor to said control member, said control member being configured to output a display signal corresponding to the motor operating signal to said dashboard upon receipt of the motor operating signal, said dashboard being configured to display a motor information related to the motor operating state of the wheel hub motor according to the display signal.

11. The driving device as claimed in claim 7, wherein said indicating unit of said indicating assembly includes:
- a display module electrically connected to said battery unit and communicatively connected to said control member; and
- a dashboard configured to, in response to receipt of a user input, output a light control signal related to light emission of said display module to said control member, said control member being configured to output a light-emitting control signal corresponding to the light control signal to said display module upon receipt of the light control signal, said display module being configured to emit light according to the light-emitting control signal.

* * * * *